Dec. 4, 1923.
F. THOMAS
AUTOMOBILE TIRE TOOL
Filed April 8, 1921
1,476,475
2 Sheets-Sheet 1
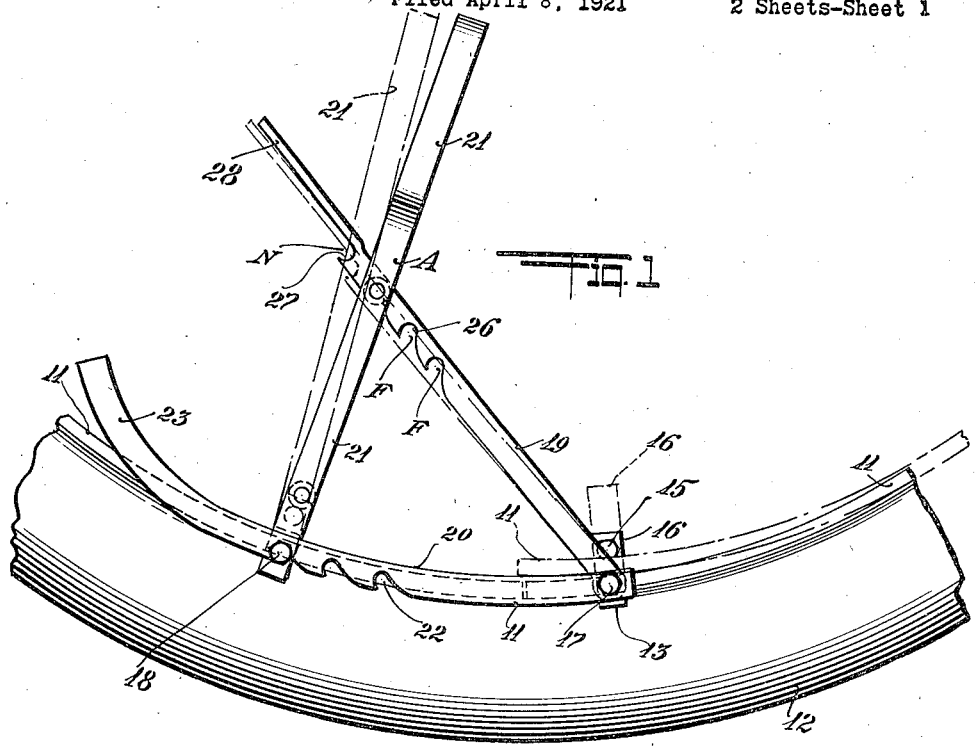
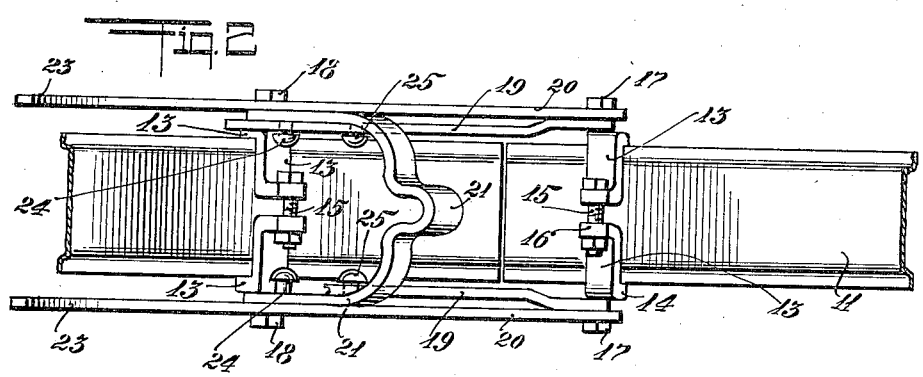
INVENTOR
Ferdinand Thomas
BY
ATTORNEY
WITNESS
M. E. Lenin Dec. 4, 1923.  
F. THOMAS  
AUTOMOBILE TIRE TOOL  
Filed April 8, 1921  
1,476,475  
2 Sheets-Sheet 2
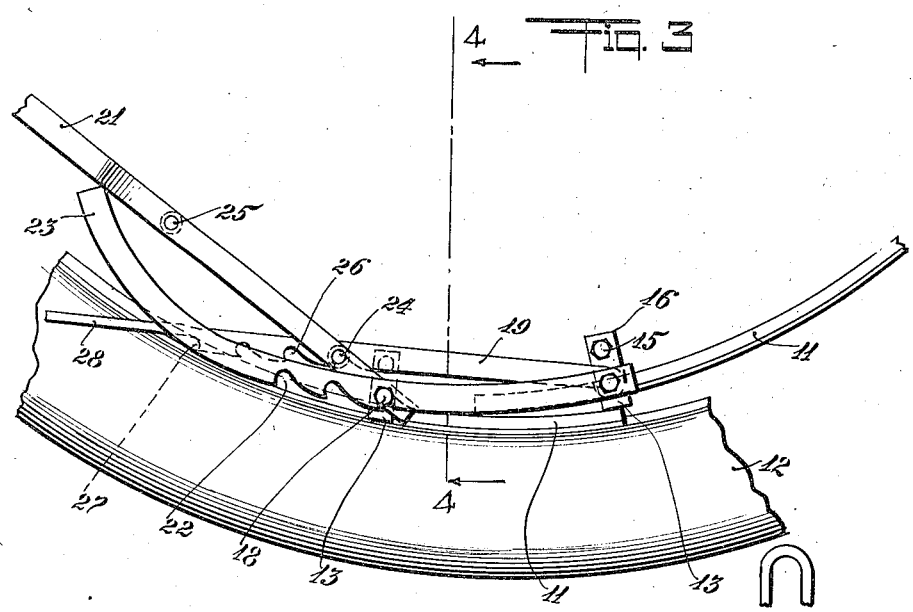
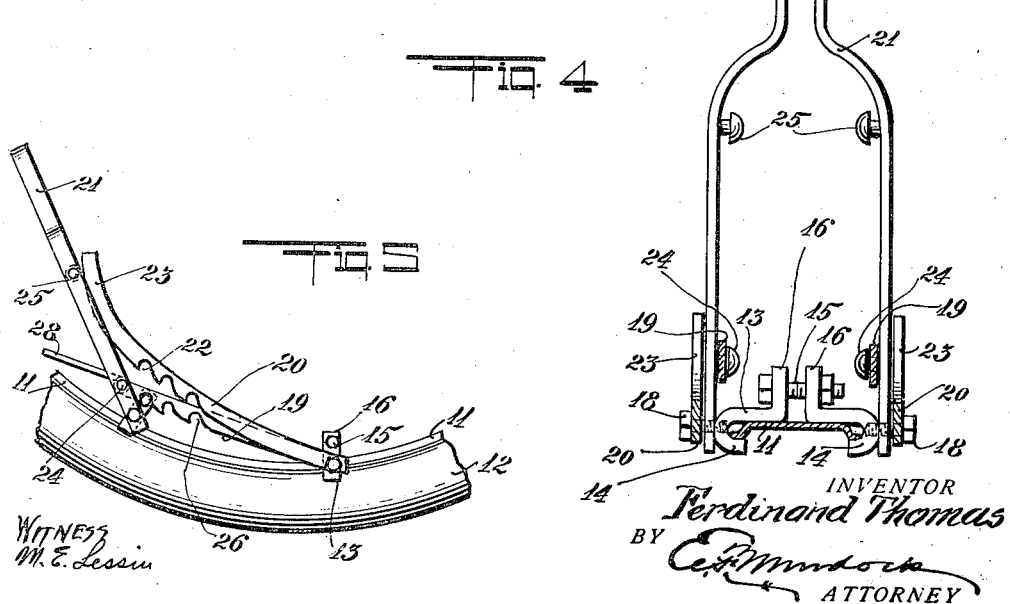
INVENTOR  
*Ferdinand Thomas*  
BY  
ATTORNEY
WITNESS  
M. E. Lessin Patented Dec. 4, 1923.

1,476,475

UNITED STATES PATENT OFFICE.

FERDINAND THOMAS, OF NEW YORK, N. Y.

AUTOMOBILE TIRE TOOL.

Application filed April 8, 1921. Serial No. 459,637.

*To all whom it may concern:*

Be it known that I, FERDINAND THOMAS, a citizen of the United States, and a resident of the city of New York, county of Bronx, State of New York, have invented certain new and useful Improvements in Automobile Tire Tools, of which the following is a full, clear, and exact description.

Among the principal objects which the present invention has in view are to facilitate the operation of removing tires of the character mentioned from metallic split rims on which they are mounted in service; to hold the rim in condition for replacement after being removed from the tire; to separate the ends of the rim prior to collapsing the same; and to replace the split ends in butted arrangement for service with ease and readiness.

Drawings.

Figure 1 is a side view of a tool of the character mentioned, constructed and arranged in accordance with the present invention, the tool being shown as in service, and in conjunction with a fragment of a pneumatic tire, the broken lines being employed to illustrate the first step in the operation of collapsing the tire rim and the disposition of the rim as the result of this operation;

Figure 2 is a top view of the same;

Figure 3 is a side view of the same, showing the parts disposed as in their final arrangement with the tire rim collapsed to its fullest extent;

Figure 4 is a cross section, the section being taken as on the line 4—4 in Figure 3;

Figure 5 is a side view on reduced scale, showing the arrangement of the tool in the position thereof after having re-expanded the rim.

Description.

The herein disclosed tool is employed for adjusting and removing the split metal tire rim 11 upon and from pneumatic tires and the shoes 12 thereof. The shoes 12 have a slight expansion, so that when in service position upon a rim 11 they hug the rim very closely. This has rendered the operation of expanding the rim on the shoe exceedingly difficult, laborious and sometimes injurious to the shoe.

When using the present tool, clamp plates 13 having hook-like extensions 14, as disclosed in Figure 4, are adjusted firmly on the edge of the rim 11 by means of screw bolts 15 at opposite sides of the separation of the rim 11. The bolts 15 are extended through perforations formed in standing lugs 16, and may be drawn rigidly upon the rim and the edges thereof. As shown in the drawings, there are two sets of plates 13 and of bolts 15. The extension 14 of said plates is provided with pivot stud bolts 17 and 18. The bolts 17 form pivots for the pull rods 19 and the retention bars 20. The studs 18 form pivots for the yoke lever 21 and detents for the bars 20. To engage the stud bolts 18 the bars 20 have recesses 22, disposed in spaced relation and undercut to form toothed constructions to engage the bolts 18.

To assist the operation and the engagement of the bars 20, the said bars are provided at their ends with curved upward extensions 23. The extensions 23 serve also as convenient handles by means of which the bars may be lifted from engagement and when desired removed out of service.

The lever 21 has at the inner side thereof stud bolts 24 and 25. The bolts 24 and 25 are arranged to be engaged by the recesses 26, formed in the under sides of the pull rods 19. The recess 27 adjacent the handle 28 of each of the pull rods 19 is intended for service only when expanding the rim 11, after the tire shoe 12 has been placed in service position.

When provided with a tool constructed and arranged in accordance with the present invention, the operation upon the rim 11 is as follows: If it is the desire of the operator to remove the rim from the tire, the clamp plates 13 are adjusted on the ends of the rim 11 at opposite sides of the split or abutted ends thereof. The bolts 15 are turned until the plates 13 become rigid on the rim. The rods 19 are adjusted within the yoke of the lever 21, and one of the recesses 26, and preferably the outermost recess, is engaged with the stud bolt 25 near the handle of the lever 21. In this position the pull rods exert primarily a pull toward the center of the ring formed by the rim and tire. This lifts the split end attached to the plates 13 having the stud bolts 17, until the end is raised above the level or service position of the opposite end of the rim. In this position it will be found that the retention bars 20 have engaged the stud bolts 18 on the plates 13 at the opposite side of the split ends. The bars 20 now correct any tendency of the rim 11 to re-expand.

The rods 19 are then disengaged from the stud bolts 25 at the upper end of the lever 21, and are lowered to engage the stud bolts 24 adjacent the lower end of the said lever 21.

It is obvious that by swinging the lever 21 away from the stud bolts 17, the raised end of the rim 11 is drawn toward the clamping plates 13 having the stud bolts 18 and the bars 20 are caused to ride over the stud bolts 18 to engage the same with the next succeeding recess 22 formed thereon. When the second recess is thus engaged, the lever 21 is swung toward the studs 17 until the studs 24 on the said lever are moved to engage the next succeeding recess 26 in the rods 19.

The parts of the tool are now in position for the lever 11 to be carried backward a second time until the next succeeding recess 22 in the bar 20 is drawn forward so that it may engage the stud bolt 18 in the plate 13. This operation is repeated as often as desired, or thought necessary to draw the raised end of the rim toward the plates having the bolts 18 with the result that the ring formation of the rim is contracted to permit the easy removal of the tire 12 therefrom.

After the tire has been repaired or replaced, it is dropped over the rim 11 into position, and the lever 21 is manipulated so that the slots 20 may be lifted clear of the bolts 18. In this position if the lever 21 be released, it will be seen that the rim 11 re-expands to nearly its full limit, or until restrained by the non-responsiveness of the tire 12. From this point it requires an expansive pressure to carry the free end of the rim 11 over the seated end thereof.

To this end the lever 21 is rocked to the position shown best in Figure 5 of the drawings, where the recess 27 is engaged with the bolts 24. In this position if the lever 21 be rocked toward the free end of the rim, the same is forced over the edge of the seated end, expanding the shoe 12 sufficiently for this action.

After the rim has been placed in service on the tire, the tool is removed therefrom by loosening the bolts 15 to permit the spread of the clamping plates 13 until freed from engagement with the rim 11.

Claims.

1. A tire tool comprising a plurality of contractible clamping plates adapted for mounting on a tire rim adjacent the split ends thereof; a lever pivotally mounted on one of said plates; a plurality of bars pivotally mounted on the other of said plates for engagement with said lever for maintaining said plates in position; pull rods pivotally mounted on said the last mentioned plates for engaging said lever for pulling the clamping plate to which the rods are attached toward the clamping plate upon which said lever is mounted; and a plurality of sets of engaging members mounted on said lever in spaced relation for operative connection by said rods, said engaging members being so arranged that when one set is connected with said rods one end of said tire rim will be moved radially toward the center of said rim, and when said rods are engaged with the other members, said end will be moved annularly.

2. A tire tool comprising a plurality of contractible clamping plates adapted for mounting on a tire rim adjacent the split ends thereof; a lever pivotally mounted on one of said plates; a plurality of bars pivotally mounted on the other of said plates for engagement with said lever for maintaining said plates in position; pulling rods mounted on said the last mentioned plates for engaging said lever for pulling the clamping plate to which said rods are attached toward the clamping plate upon which said lever is mounted, said rods having on the lower edges a series of recesses for engaging said lever or members extended therefrom; and a plurality of sets of stud bolts extended from the sides of said lever at different distances from the pivotal mounting thereof for engagement with said recesses, said sets of stud bolts being sufficiently removed one from the other that when one set of the same is connected by said pull rods one end of said tire rim will be moved substantially radially and when said pull rods are engaged with the other of said sets of stud bolts said rim end will be moved substantially tangentially.

FERDINAND THOMAS.